US007693512B1

(12) United States Patent
West

(10) Patent No.: US 7,693,512 B1
(45) Date of Patent: Apr. 6, 2010

(54) SYSTEMS AND METHODS FOR LOCATION-BASED FORWARDING OF COMMUNICATION SERVICES

(75) Inventor: Barry John West, Reston, VA (US)

(73) Assignee: Nextel Communications Inc., Reston, VA (US)

( * ) Notice: Subject to any disclaimer, the term of this patent is extended or adjusted under 35 U.S.C. 154(b) by 896 days.

(21) Appl. No.: 11/338,400

(22) Filed: Jan. 24, 2006

Related U.S. Application Data

(60) Provisional application No. 60/645,723, filed on Jan. 24, 2005.

(51) Int. Cl.
 *H04M 3/42* (2006.01)
(52) U.S. Cl. .................................... 455/417; 455/456.1
(58) Field of Classification Search ............... 455/456.1, 455/414.1, 414.2, 414.3, 414.4, 417
 See application file for complete search history.

(56) References Cited

U.S. PATENT DOCUMENTS

| | | | | |
|---|---|---|---|---|
| 5,924,027 | A * | 7/1999 | Valentine et al. ............. | 455/417 |
| 6,664,896 | B2 * | 12/2003 | McDonald et al. ........ | 340/572.1 |
| 6,856,806 | B1 * | 2/2005 | Bosik et al. .................. | 455/445 |
| 7,006,833 | B1 * | 2/2006 | Contractor ................ | 455/456.1 |
| 7,215,968 | B2 * | 5/2007 | Fujiwara ................... | 455/456.3 |

\* cited by examiner

*Primary Examiner*—Nick Corsaro
*Assistant Examiner*—Vladimir Magloire

(57) ABSTRACT

Disclosed is a personal identity beacon, which can be attached to a keychain, integrated into jewelry, and the like. The personal identity beacon can include a GPS receiver and a transmitter for communicating with a wireless macro network. The subscriber is also provided with universal service identifiers (e.g., telephone numbers, e-mail addresses and the like). The beacon periodically determines its current location and forwards its determined location to the wireless macro network. A subscriber registers geographic locations for forwarding communication services, such as home, the office, and the like, and corresponding communication service identifiers. When the wireless macro network receives a geographic location from the beacon identifying a new location, which corresponds to one registered by the subscriber, the wireless macro network automatically forwards communications destined for the universal service identifiers to the subscriber's communication service identifiers registered for that location, e.g., phone calls to a landline phone, e-mail to a particular e-mail account, etc. Because the personal identity beacon is integrated with, or attached to, an article, which a consumer will always carry with them, the personal identity beacon simplifies the automatic forwarding of communication services.

25 Claims, 3 Drawing Sheets

| PIB IDENTIFICATION NUMBER | | |
|---|---|---|
| LOCATION | COMMUNICATION SERVICES AVAILABLE | UNIVERSAL SERVICE IDENTIFIER(S) |
| LOCATION 1 | LANDLINE TELEPHONE<br>FACSIMILE<br>E-MAIL SERVICE | 1-714-555-1348<br>1-714-555-1349<br>JOHNDOE@COMPANYZ.COM |
| LOCATION 2 | LANDLINE TELEPHONE<br>FACSIMILE<br>E-MAIL<br>DISPATCH | 1-949-555-1300<br>1-949-555-1350<br>JOHNDOE@COMPANYX.COM<br>194.168.1.1 |
| LOCATION 3 | LANDLINE TELEPHONE<br>FACSIMILE<br>E-MAIL | 1-310-555-1440<br>1-310-555-1460<br>JOHNDOE@COMPANYQ.COM |
| DEFAULT LOCATION | MOBILE TELEPHONE<br>EMAIL<br>DISPATCH | 1-949-555-6523<br>JOHNDOE@DISPATCHNET.COM<br>182*4567*6211 |
| CURRENT LOCATION (e.g., LOCATION 1) | | |

FIGURE 2

SYSTEMS AND METHODS FOR LOCATION-BASED FORWARDING OF COMMUNICATION SERVICES

CROSS REFERENCE TO A RELATED APPLICATION

This application claims the benefit of the filing date of Provisional Application Ser. No. 60/645,723, filed on Jan. 24, 2005, which is incorporated herein by reference.

BACKGROUND OF THE INVENTION

Consumers typically have duplicative communication services for different geographic locations. For example, consumers may have different landline voice, facsimile, wireless, and electronic mail communication services for work and home. Accordingly, when a consumer is at work, the consumer may miss communications which are directed to his/her home communication services.

Various types of forwarding techniques can be used to address the difficulties of maintaining numerous duplicative communication services. Cingular Wireless offers a call forwarding service, which requires a subscriber to place the wireless phone in a special cradle, to identify to the wireless network that the subscriber's wireless communication services should be forwarded to the subscriber's home telephone. This requires the subscriber to remember to place the wireless phone in the cradle for the service to operate properly. Additionally, this service only forwards one type of communication service, i.e., wireless voice services. Accordingly, it would be desirable to provide systems and methods for automatically forwarding numerous different communication services based on a consumer's current location.

SUMMARY OF THE INVENTION

An aspect of the invention relates to a personal identity beacon, which can be attached to a keychain, integrated into jewelry, and the like. The personal identity beacon can include a GPS receiver and a transmitter for communicating with a wireless macro network. The subscriber is also provided with universal service identifiers (e.g., telephone numbers, e-mail addresses and the like). The beacon periodically determines its current location and forwards its determined location to the wireless macro network. A subscriber registers geographic locations for forwarding communication services, such as home, the office, and the like, and corresponding communication service identifiers.

When the wireless macro network receives a geographic location from the beacon identifying a new location, which corresponds to one registered by the subscriber, the wireless macro network automatically forwards communications destined for the universal service identifiers to the subscriber's communication service identifiers registered for that location, e.g., phone calls to a landline phone, e-mail to a particular e-mail account, etc. Because the personal identity beacon is integrated with, or attached to, an article, which a consumer will always carry with them, the personal identity beacon simplifies the automatic forwarding of communication services.

Another aspect of the invention relates to a communication system for implementing the communication forwarding technique. The communication system comprises a network; and a network device (e.g., a server) coupled to the network. The network device is adapted to receive a communication intended for a first communication service of a user; determine the type of the first communication service; access a data object pertaining to the user with information contained in the communication; determine an approximate current location of the user by accessing current location information contained in the data object; determine a second communication service associated with the current location information and of the same type as the first communication service, by accessing available communication service information contained in the data object; and forward the communication to the second communication service.

Other objects, advantages and novel features of the present invention will become apparent from the following detailed description of the invention when considered in conjunction with the accompanying drawings.

BRIEF DESCRIPTION OF THE DRAWING FIGURES

FIG. 2 illustrates an exemplary data object used by an exemplary communication forwarding server in accordance with another embodiment of the invention.

DETAILED DESCRIPTION OF THE PREFERRED EMBODIMENTS

In accordance with exemplary embodiments of the present invention, a subscriber of the communication forwarding service is provided with a personal identity beacon. The personal identity beacon can be attached to a keychain, integrated into jewelry, or the like. The beacon may be incorporated into an item that a user typically carries so as to identify the user's current location. The personal identity beacon includes circuitry for identifying its location, and for forwarding the identified location to a wireless macro network.

The circuitry for identifying the beacon's location can be a global positioning satellite (GPS) circuitry, or some type of circuitry for location determination using signals from the wireless macro network, e.g., triangulating signals received from at least three base transceiver stations (BTS) in the wireless macro network. Instead of the beacon determining its own location, the beacon can collect data which can be forwarded to the wireless macro network for the latter to determine the beacon's current location. The circuitry for forwarding the identified location to the wireless macro network can be any type of circuitry, which is capable of transmitting information to a wireless macro network. The following illustrates an exemplary communication system which provides this feature.

Figure 1:
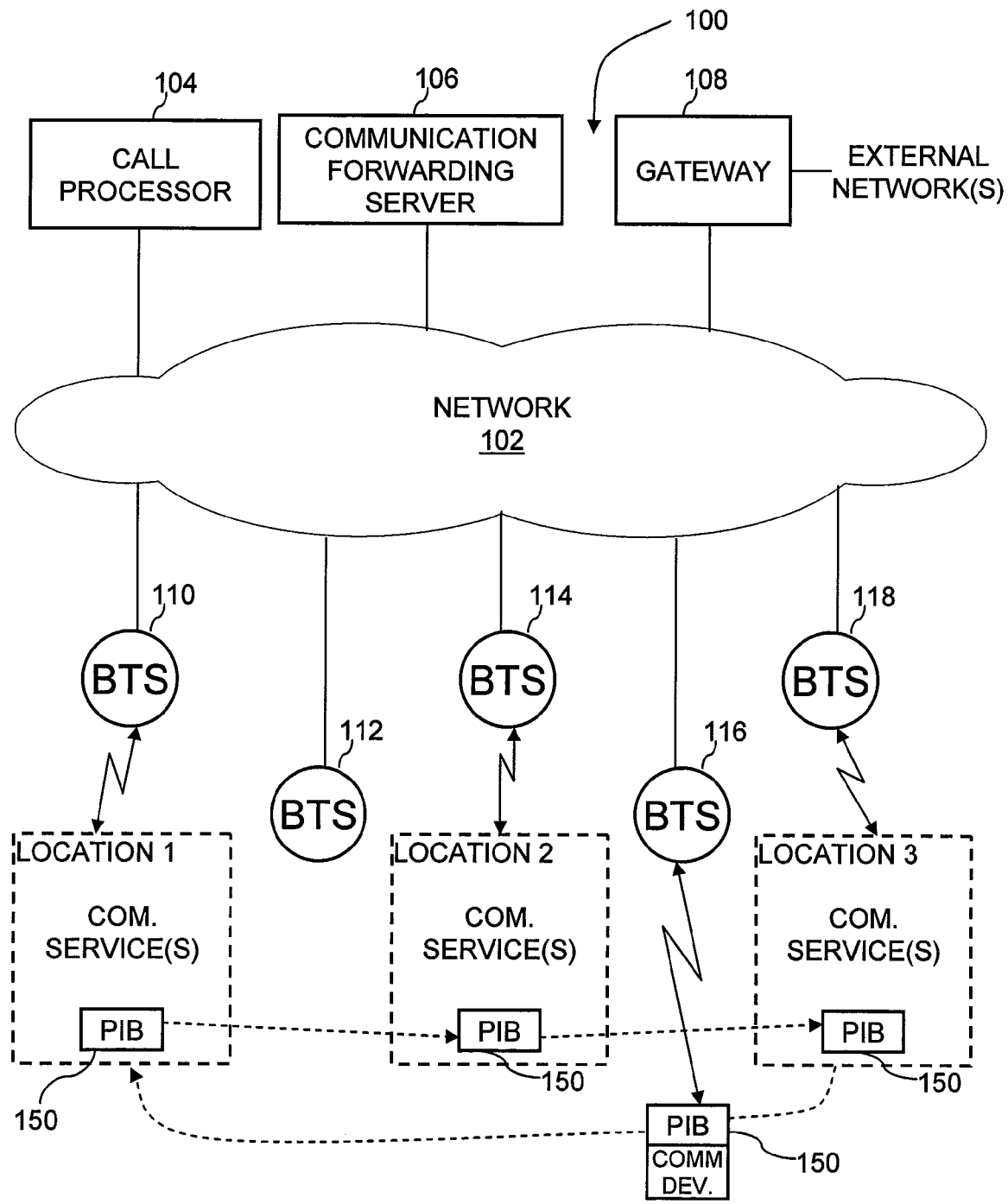
FIG. 1 illustrates a block diagram of an exemplary communication system in accordance with an embodiment of the invention.

FIG. 1 illustrates a block diagram of an exemplary communication system 100 in accordance with an embodiment of the invention. The communication system 100 comprises a communications network 102, a plurality of network devices, such as a call processor 104, communication forwarding server 106, and gateway 108, coupled to the communications network 102, and a plurality of base transceiver stations (BTS), five (5) of which are shown as base transceiver stations (BTS) 110, 112, 114, 116, and 118.

In this example, the communication forwarding server 106 operates to perform the forwarding of communication services as discussed in more detail below. The call processor 104 operates to establish traffic channels with some or all communication devices identified in the registered locations for communication forwarding purposes. The gateway 108 provides an interface to one or more external networks for the purpose of sending communications to some or all communication devices identified in the registered locations for communication forwarding purposes. The one or more external networks may include a wide area network (WAN), such as the Internet, a public switch telephone network (PSTN), and other public and/or private networks.

The communications network 102 provides a communications medium to allow the network devices 104, 106, and 108 and the base transceiver stations (BTS) 110, 112, 114, 116, and 118 to communicate with each other. The communications network 102 may be based on any type of technology, such as internet protocol (IP), asynchronous transfer mode (ATM), frame relay, any combination thereof, or others.

The base transceiver stations (BTS) 110, 112, 114, 116, and 118 each provide a communication interface between a wireless environment in which some communication devices reside and the wired environment of the communications network 102. Each base transceiver station (BTS) provides wireless communication services within a limited region. In this example, base transceiver stations (BTS) 110 provides wireless services to one or more communication devices residing in location 1 (among other locations); base transceiver stations (BTS) 114 provides wireless services to one or more communication devices residing in location 2 (among other locations); and base transceiver stations (BTS) 118 provides wireless services to one or more communication devices residing in location 3 (among other locations).

As discussed in the Background section, people typically tend to be at a plurality of different predetermined locations during a day, a week or other time period. For instance, a person may be at home at a particular time of day, then at work at another time of day, and at another work site twice a month. Each of these locations may have a different set of communication services available. For example, in the person's home, the available communication services may include a landline telephone, a facsimile, an email service; in the person's place of work, there may be a different set of communication services for example a different landline telephone, a different facsimile, a dispatch communication device, and a different email service; and, even still, at another location, such as another work site to which the person regularly travels, there may be a different set of communication services. In accordance with an aspect of the invention, the communication system 100 forwards incoming communications for a user based on the user's current location.

In accordance with another aspect of the invention, a user is provided with a personal identity beacon (PIB). The personal identity beacon (PIB) sends identity and current location information to the communication system 100. Based on the identity and location information, the communication system 100 forwards incoming communication to a communication device associated with the current location of the personal identity beacon (PIB). The personal identity beacon (PIB) can be configured into many forms, such as a keychain, jewelry, and mobile communication device (e.g., a cellular telephone).

The personal identity beacon (PIB) may include a transmitter and global positioning system (GPS) receiver or other devices used for determining the current location of the personal identity beacon (PIB). In the case of a GPS receiver, the receiver determines the approximate current location of the personal identity beacon (PIB) from the signals it receives from various GPS satellites. The personal identity beacon (PIB) then sends its identity information as well as its approximate current location information to the communication system 100. The personal identity beacon (PIB) may also use a triangulation algorithm using signals it receives from three or more base transceiver station (BTS). Using such signals, the personal identity beacon (PIB) may calculate its own approximate current location and send that information to the communication system 100. Or, alternatively, the personal identity beacon (PIB) may send information related to those signals to the communication system 100 for the purpose of having the communication system 100 determine the approximate current location of the personal identity beacon (PIB).

With reference to again to FIG. 1, a user may be regularly be present in a plurality of locations, such as locations 1, 2, and 3 as shown. Each of the locations 1, 2, and 3 have one or more available communication service(s). For example, location 1 could be a user's home, location 2 could be a user's place of work, and location 3 could be the user's secondary work office located in another city, state, or country. Some or all of the one or more available communication devices in each of these location may communicate wirelessly with the communication system 100. For example, the one or more communication devices in location 1 may communicate wirelessly with the communication system 100 by way of base transceiver station (BTS) 110; the one or more communication devices in location 2 may communicate wirelessly with the communication system 100 by way of base transceiver station (BTS) 114; and the one or more communication devices in location 3 may communicate wirelessly with the communication system 100 by way of base transceiver station (BTS) 118.

A user requesting the communication forwarding services from the communication system 100 may register with the service provider operating the communication system 100. The registration process may be performed via a website operated by the service provider, or over the telephone with a representative of the service provider. During the registration process, the user provides information related to various predetermined locations, such as locations 1, 2 and 3, information related to the one or more available communication services at each of the predetermined locations, and possibly other information, such as personal information. In response to the registration process, the service provider creates a data object for the received information and generates a personal identity beacon (PIB) identification number for identifying the user's personal identity beacon (PIB) and accessing the data object during a communication forwarding operation. The service provider may then provide the user with a personal identity beacon (PIB) device including the identification number, or program the user's handheld communication device with the identification number and software related to the communication forwarding service.

The created data object may be stored in a local memory of the communication forwarding server 106. With reference to FIG. 2, which illustrates an exemplary data object used by the communication forwarding server 106, the PIB identification number may be used by the communication forwarding server 106 to access the data object. The data object may include a location field containing information related to the predetermined locations, such as locations 1, 2, and 3, and possibly a default location in the case the personal identity beacon (PIB) is not at any of the predetermined locations. Also, the data object may include an available communication services field containing information related to the one or more available communication services at each of the predetermined and default locations. Additionally, the data object may include a universal service identifier field containing information related to the contact addresses for the one or more available communication services at each of the predetermined and default locations. Further, the data object may include a current location field containing information related to the approximate current location of the personal identity beacon (PIB) 150.

In this example, the data object contains information related to location 1 including available communication services of a landline telephone (1-714-555-1348), facsimile (1-714-555-1349), and email service johndoe@xyznet.com). The data object also contains information related to location 2 including available communication services of a landline telephone (1-949-555-1300), facsimile (1-949-555-1350), email service john.m.doe@companyz.com), and dispatch service (194.168.1.1). In addition, the data object contains information related to location 3 including available communication services of a landline telephone (1-310-555-1440), a facsimile (1-310-555-1460), and email service jmdoe@companyq.com). Additionally, the data object may contain information related to a default location including available communication services of a mobile telephone (1-949-555-6523), email service jdoe@companyz.com), and dispatch service (182*4567*6211). Further, the data object may contain the PIB current location information as being location 1.

With reference to both FIGS. 1 and 2, the user carrying the personal identity beacon (PIB) 150 may be initially in location 1. At that location, the personal identity beacon (PIB) 150 may, on occasion (automatically or manually), wirelessly send information related to its identity and current location to the communication forwarding server 106 by way of base transceiver station (BTS) 110. This information may be sent to the communication forwarding server 106 by way of a common traffic channel, or a dedicated traffic channel which may be set up by the call processor 104.

The communication forwarding server 106 may receive this information, and update the corresponding data object accordingly. If, for example, while the user is at location 1, the communication forwarding server 106 receives an email intended for the user's location 2 email address (e.g., intended for john.m.doe@companyz.com), the communication forwarding server 106 recognizes the user is at location 1 based on the current location information in the data object, and forwards the email address to the user's location 1 email address (e.g., johndoe@xyznet.com).

If, for example, the user travels to location 2, the personal identity beacon (PIB) sends the new current location information to the communication forwarding server 106. In response to receiving the information, the communication forwarding server 106 may update the data object to reflect the new current location for the user. Then, for example, while the user is at location 2, the communication forwarding server 106 receives a dispatch call intended for the user's default location dispatch (e.g., intended for 182*4567*6211), the communication forwarding server 106 recognizes the user is at location 2 based on the current location information in the data object, and forwards the dispatch call to the user's location 2 dispatch service (e.g., 194.168.1.1).

If, for example, the user travels to location 3, the personal identity beacon (PIB) sends the new current location information to the communication forwarding server 106. In response to receiving the information, the communication forwarding server 106 may update the data object to reflect the new current location for the user. Then, for example, while the user is at location 3, the communication forwarding server 106 receives a facsimile intended for the user's location 2 fax machine (e.g., intended for 1-949-555-1350), the communication forwarding server 106 recognizes the user is at location 3 based on the current location information in the data object, and forwards the facsimile to the user's location 3 fax machine (e.g., 1-310-555-1460).

If, for example, the user is in transit from location 3 to location 1 (e.g., the user is in the default location), the personal identity beacon (PIB) sends the new current location information to the communication forwarding server 106. In response to receiving the information, the communication forwarding server 106 may update the data object to reflect the new current location for the user. Then, for example, while the user is at the default location, the communication forwarding server 106 receives a dispatch call intended for the user's location 2 dispatch service (e.g., intended for 194.168.1.1), the communication forwarding server 106 recognizes the user is at the default location based on the current location information in the data object, and forwards the dispatch call to the user's default location dispatch service (e.g., 182*4567*6211). The following further explains the communication forwarding process in a more step-by-step approach.

Figure 3:
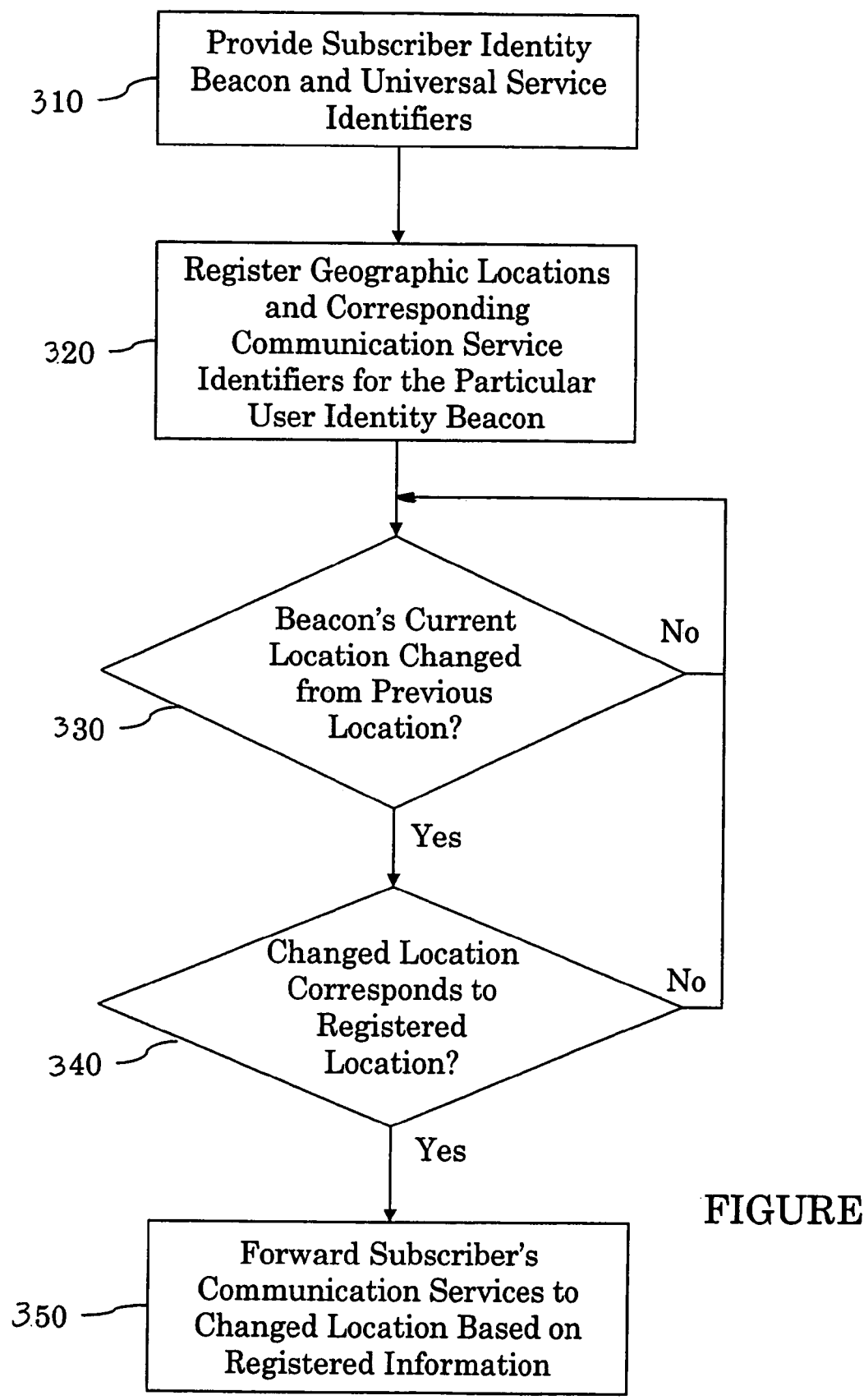
FIG. 3 illustrates an exemplary method for forwarding communication services in accordance with another embodiment of the invention.

FIG. 3 illustrates an exemplary method for forwarding communication services in accordance with the present invention. A subscriber of the location forwarding service is provided with an identity beacon, which has a unique identifier, and universal communication service identifiers (e.g., a telephone number, e-mail address, and the like), (step 310). The subscriber registers geographic locations and corresponding communication service identifiers for the particular identity beacon (step 320). For example, the subscriber can register their office as a geographic location and the subscriber's office telephone, facsimile machine and e-mail address as the communication service identifiers for the geographic location. The subscriber can also register his/her home as a geographic location and the associated home telephone, facsimile and e-mail addresses as the associated communication service identifiers. The subscriber can perform the registration using, for example, a web browser. Additionally, or alternatively, the subscriber can contact the provider of the service who can then perform such a registration. Accordingly, the subscriber will provide people with his/her universal communication service identifiers, and the present invention automatically forwards, based on geographic location, the communications to the universal communication service identifiers to those communication service identifiers registered by the subscriber.

After the subscriber has performed the registration sequence, a determination of whether the beacon's current location has changed from a previously registered location is performed (step 330). This determination can be performed automatically on a periodic basis, the period being either predetermined by the service provider, or set by the subscriber. Alternatively, or additionally, the user could cause a "manual" update of the location, such as by activating a button on the beacon. If the beacon's current location has changed from its previous location ("Yes" path out of decision step 330), then it is determined whether the changed location corresponds to a registered location (step 340). If the changed location corresponds to a registered location ("Yes" path out of decision step 340), then the subscriber's communication services are forwarded to the changed location based on the registered information (step 350).

Although FIG. 3 illustrates that no action is taken when the changed location does not correspond to a registered location ("No" path out of decision step 340), the subscriber can register a particular action when such a determination is made (e.g., such as in the default location scenario). For example, the subscriber can register his/her wireless communication station as the destination for communications intended for the subscriber's other communication services (e.g., home and work voice telephone lines), will be forwarded when the subscriber's current location is does not correspond to a specific geographic location.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A communication system, comprising:
    a network;
    a communication forwarding server coupled to said network, wherein said communication forwarding server is configured to:
    receive a communication, by way of the network intended for a first communication service of a user;
    determine a type of said first communication service;
    access a data object pertaining to said user with information contained in said communication, wherein the data object includes available communication service information identifying at least two types of communication services for each of at least two locations;
    determine an approximate current location of said user by accessing current location information contained in said data object;
    determine a second communication service associated with said current location information and of the same type as said first communication service, by accessing the available communication service information contained said data object; and
    forward said communication, by way of the network to said second communication service,
    wherein when the communication forwarding server receives a communication intended for any of the at least two types of communication services at either of the two locations, the communication forwarding server forwards the communication to a communication service at the user's current location.

2. The communication system of claim 1, wherein said communication forwarding server sends said communication to said second communication service by way of a base transceiver station (BTS).

3. The communication system of claim 2, further comprising a gateway coupled to said network, wherein said gateway is configured to set up a traffic channel through which said communication is sent.

4. The communication system of claim 1, wherein said communication forwarding server sends said communication to said second communication service by way of an external network.

5. The communication system of claim 4, wherein said external network comprises a wide area network (WAN).

6. The communication system of claim 4, wherein said external network comprises a public switch telephone network (PSTN).

7. The communication system of claim 4, further comprising a gateway configured to serve as an interface between said network and said external network, and through which said communication is sent to said second communication service.

8. The communication system of claim 1, wherein said communication forwarding server is further configured to receive said current location information from a wireless communication device.

9. The communication system of claim 8, wherein said current location information is received by way of a base transceiver station (BTS).

10. The communication system of claim 9, wherein said current location information is received by way of a common traffic channel between said base transceiver station (BTS) and said wireless communication device.

11. The communication system of claim 9, wherein said current location information is received by way of a dedicated traffic channel between said base transceiver station (BTS) and said wireless communication device.

12. The communication system of claim 1, wherein said communication forwarding server is further configured to receive a new current location information from a wireless communication device.

13. The communication system of claim 12, wherein said communication forwarding server is further configured to update said data object to reflect said new current location information.

14. The communication system of claim 1, wherein said type of said first communication service comprises email.

15. The communication system of claim 1, wherein said type of said first communication service comprises dispatch.

16. The communication system of claim 1, wherein said type of said first communication service comprises facsimile.

17. The communication system of claim 1, wherein said type of said first communication service comprises telephone.

18. The communication system of claim 1, wherein said communication forwarding server is further configured to:
    access address information associated with said second communication service from said data object; and
    send said communication to said second communication service using said address information.

19. A network device communication forwarding server configured to:
    receive a communication intended for a first communication service of a user;
    determine a type of said first communication service;
    access a data object pertaining to said user with information contained in said communication, wherein the data object includes available communication service information identifying at least two types of communication services for each of at least two locations;
    determine an approximate current location of said user by accessing current location information contained in said data object;
    determine a second communication service associated with said current location information and of the same type as said first communication service, by accessing the available communication service information contained in said data object; and
    forward said communication to said second communication service,
    wherein when the communication forwarding server receives a communication intended for any of the at least two types of communication services at either of the two locations, the communication forwarding server forwards the communication to a communication service at the user's current location.

20. The communication forwarding server of claim 19, further configured to receive said current location information from a wireless communication device.

21. The communication forwarding server of claim 19, further configured to receive a new current location information from a wireless communication device.

22. The communication forwarding server of claim 21, further configured to update said data object to reflect said new current location information.

23. The communication forwarding server of claim 19, further configured to:
- access address information associated with said second communication service from said data object; and
- send said communication to said second communication service using said address information.

24. A method for location-based forwarding of communication service, the method comprising the acts of:
- providing a subscriber with communication identifiers corresponding to at least two types of communication services for at least two geographic locations;
- registering the geographic locations and corresponding communication service identifiers associated with an identity beacon;
- determining whether a current location of the identity beacon has changed from a previous location of the identity beacon, wherein the identity beacon is incorporated into at least one of a keychain and jewelry;
- determining whether the changed location corresponds to a registered geographic location by accessing a data object pertaining to said subscriber with information contained in the communication services, wherein the data object includes available communication service information identifying at least two types of communication services for each of at least two locations; and
- forwarding the communication services intended for the communication identifiers to the associated communication service identifications when it is determined that the changed location corresponds to a registered location, wherein when a communication intended for any of the at least two types of communication services at either of the two locations is received, the first network device forwards the communication to a communication service at the user's current location.

25. The method of claim 24, wherein if the changed location does not correspond to a registered location, communication services are forwarded to default communication service identifications.

* * * * *